United States Patent

[11] 3,599,659

[72] Inventors Andrew G. Nuter
1055 N. Massasait, Chicago, Ill. 60651;
Theodore Mackowan, 1522 N. 24th Ave.,
Melrose Park, Ill. 60160
[21] Appl. No. 25,912
[22] Filed Apr. 6, 1970
[45] Patented Aug. 17, 1971

[54] AIR RELEASE VALVE
7 Claims, 4 Drawing Figs.
[52] U.S. Cl. ..................................................... 137/202,
137/445
[51] Int. Cl. ..................................................... F16k 45/02,
F16k 31/24
[50] Field of Search ......................................... 137/202,
445

[56] References Cited
UNITED STATES PATENTS
3,168,103  2/1965  Kochaver ................... 137/202
1,119,980  12/1914  Mulligan ..................... 137/202 X
3,006,359  10/1961  Lister .......................... 137/445 X Primary Examiner—Alan Cohan
Attorney—Dawson, Tilton, Fallon and Lungmus ABSTRACT: A valve casing includes a top plate which provides a release orifice and a lower inlet aperture communicating with pressurized liquid from which entrained air is to be released. A metallic float having a peripherally depending skirt is located over the inlet aperture; and the float is connected to a compound lever linkage, the other end of which supports a closure member adapted to seal the release orifice when the liquid level in the housing exceeds a predetermined level or when the inrush of water engages the peripheral skirt of the float to force it upward. The compound lever linkage includes upper and lower lever arms pivotally mounted in a cradle bracket secured to the top plate within the chamber. The closure member is adjustably mounted to the upper lever arm to insure proper sealing. The same arrangement may be used for a wide range of fluid pressure; and it permits fabrication using all stainless steel parts except for the housing and closure member without the need of castings.

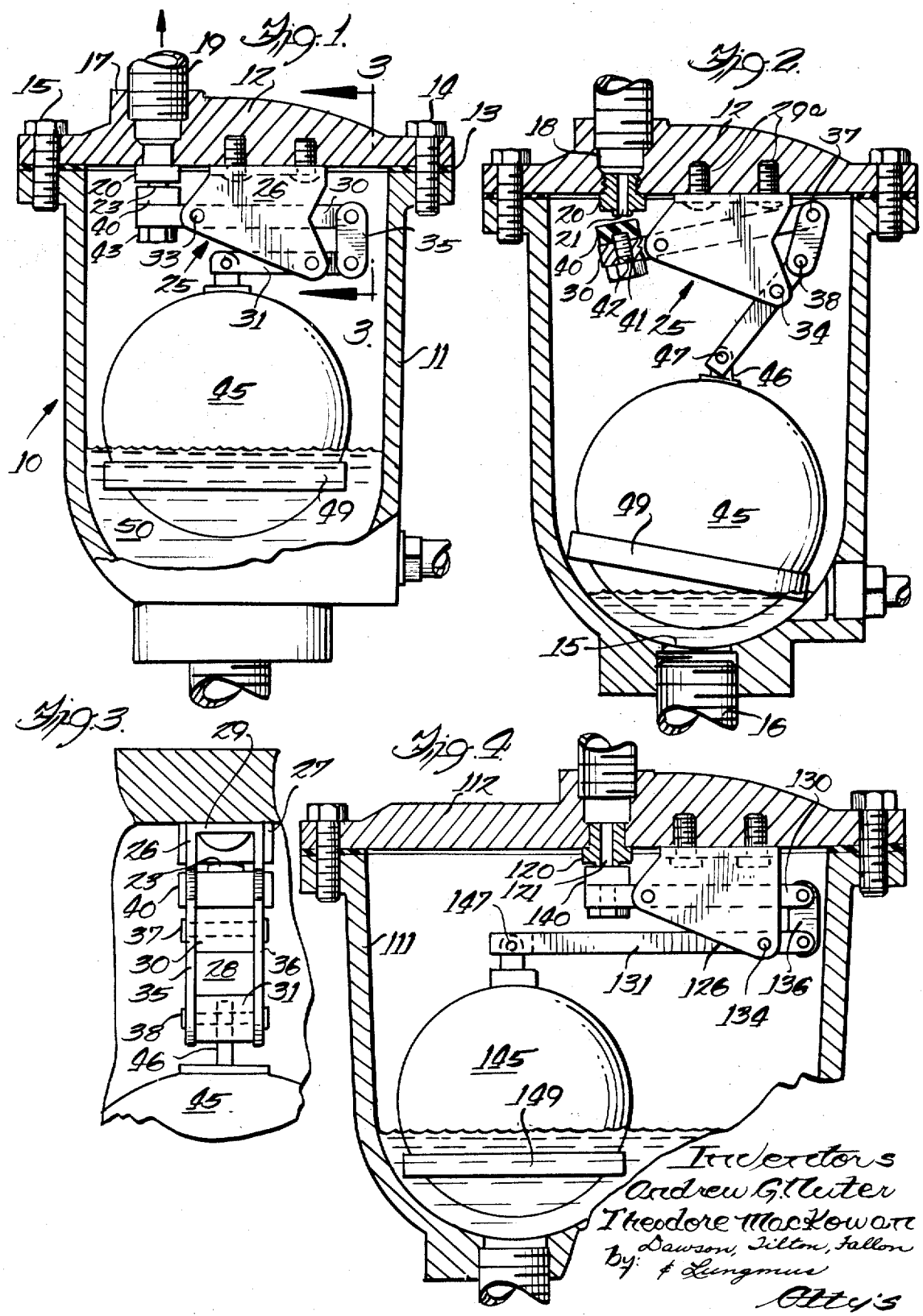

AIR RELEASE VALVE

BACKGROUND AND SUMMARY

The present invention relates to improvements in air release valves. Air release valves of the type with which the present invention is primarily concerned are used to release a gas entrained in a liquid under pressure, for example, air entrained in water being pumped. If air is permitted to collect, it decreases system efficiency. Air release valves of this type may be used in combination with centrifugal pumps, hydropneumatic tanks, pipe lines or various types, priming systems, etc.

Heretofore, commercially available air release valves have employed castings for mounting the lever mechanism which links the metallic float to the closure member. Not only do such castings contribute significantly to the fabrication costs of an air release valve, but more importantly, they confine the type of lever arrangement used; and each casting is suitable for use only over a predetermined pressure range. Such castings are normally made of bronze; whereas it is desirable to use stainless steel parts within the valve wherever possible. Further, prior air release valves have suffered from the disadvantage that upon a strong inrush of water into the valve chamber when the release orifice is unsealed permits the escape of water through the release valve.

In the present invention a stainless steel cradle bracket is mounted to the lower surface of the top plate of the valve housing, and it includes side plates which depend downwardly. An upper and a lower lever arm are pivotally mounted to and extend between the side plates of the cradle bracket; and they are linked together at a first or outboard end so that upward motion of the free end of the lower lever arm will produce a corresponding upward motion in the free end of the upper lever arm.

A metallic float is pivotally (or, alternatively, directly) connected to the free end of the lower pivot arm, and a peripheral skirt or deflecting flange is secured to the float opposing the water inlet which communicates with the pressurized water. A flexible closure member is adjustably mounted to the free end of the upper lever arm for engaging and sealing the release orifice when the metallic float is in its upper position, indicative of a predetermined minimum amount of trapped air within the valve housing. If more trapped air enters the valve housing, it displaces some of the water which holds the float buoyant, and the float falls under gravity to open the release valve. As the pressurized, trapped air is exhausted through the release aperture, water rushes into the valve housing to displace the released air; and since the internal pressure is usually fairly high, the displacing water will gush into the valve housing. The initial gush of water will impinge upon the metallic float and be forced against the deflecting peripheral flange to be forced downwardly. The reaction force induced in the metallic float causes a very quick reaction of the lever mechanism to seal the release orifice.

The cradle bracket which pivotally supports the upper and lower lever arms as well as the links interconnecting the upper and lower lever arms are formed of stainless steel sheet material—thus avoiding the need for castings. Further, with the particular cradle bracket disclosed herein, the lever arms may be formed of stainless steel bar stock. The inventive arrangement thereby provides great reliability while significantly reducing the fabrication and material costs. Further, the same arrangement may be used over a continuum of design pressure ranges merely by lengthening the distance between the pivotal connection of the lower lever arm to the cradle bracket and the pivotal connection of the metallic float to the free end of the lower lever arm thus affording a greater mechanical advantage for the higher design pressure ranges.

The deflecting peripheral skirt flange provided on the metallic float takes advantage of the jet or gush of inlet water when the release orifice is open to cause a fast initial reaction in the closing lever mechanism while preventing the escape of water by deflecting the water downwardly and away from the release valve. Other features and advantages of the present invention will be apparent to persons skilled in the art from the following detailed description of a preferred and an alternative embodiment accompanied by the attached drawing.

THE DRAWING

FIG. 1 is a front elevation view, mostly cut away, of an air release valve mechanism according to the present invention in a closed position;

FIG. 2 is a vertical cross section view of the valve of FIG. 1 with the release orifice opened to permit trapped air to exhaust;

FIG. 3 is a side elevation view of the cradle bracket and linkage assembly taken through the sight line 3–3 of FIG. 1; and FIG. 4 is a front elevation view, in cross section, of an alternative embodiment of the valve of FIGS. 1—3, designed for use with a higher pressure system.

DETAILED DESCRIPTION

Turning first of FIGS. 1—3, a housing for the inventive air release valve is generally designated by reference numeral 10; and it includes a cup-shaped lower member 11 and a cover plate 12, both of which may be cast iron. A gasket 13 is interposed between the cover plate 12 and the cup-shaped member 11; and the two are secured together by means of bolts 14.

At the bottom center portion of the cup-shaped member 11, there is provided an inlet aperture 15 which communicates the interior of the housing 10 with pressurized liquid (hereinafter water) by means of a threaded conduit 16. The cover plate 12 is provided with a boss 17 which defines an aperture 18 having an upper portion which threadably receives an air release conduit 19 and a lower portion which threadably receives a bushing 20. The bushing 20 defines a central orifice 21—the air release orifice. The bushing 20 also includes a lower rim 23 surrounding the air release orifice 21; and the rim 23 provides a seating surface for receiving a closure member presently to be described.

A cradle bracket generally designated 25 is located within the chamber defined by the housing 10; and it is secured to the lower surface of the cover plate 12 adjacent the release orifice 21. As seen in FIG. 3, the cradle bracket 25 includes first and second vertical side plates 26 and 27 (spaced apart to define a central channel 28) and an upper mounting plate 29 through which bolts 29a are placed for securing the cradle bracket to the cover plate 12. The cradle bracket is formed from a continuous, integral piece of stainless steel plate stock.

Received within the channel 28 defined by the cradle bracket 25 are upper and lower lever arms designated respectively by reference numerals 30 and 31. The upper lever arm is pivotally connected to the cradle bracket 25 by means of a pin 33. The lower lever arm 31 is similarly pivotally mounted in the channel 28 of the cradle bracket 25 by means of a pin 34. At one end (the right side as viewed in FIGS. 1 and 2) the upper lever arm 30 and the lower arm 31 are linked together by means of side links 35 and 36 which are pivotally secured to the upper lever arm 30 by means of a pin 37 and similarly secured to the lower lever arm by means of a pin 38.

Affixed to the free end of the upper lever 30 is a flexible, resilient seating member 40, which may be of neoprene rubber. The flexible closure member 40 is provided with a a threaded stud 41 which is threadably received in an aperture 42 in the free end of the upper lever 30 beneath the release aperture 21. A locknut 43 is received on the threaded stud 41 beneath the lever arm 30 for securing the closure member tightly to that lever arm. Thus, the closure member 40 may be adjustably located on the lever arm 30 and then secured thereto. This is considered to be an important advantage of the present invention because it insures a proper, even sealing of the release orifice 21 and may be accomplished easily during assembly by aligning the two lever arms 30 and 31 in parallel arrangement (FIG. 1) and screwing the closure member upward until it engages the seating rim 23.

At the free end of the lower lever arm 31 there is pivotally connected a hollow, metallic float 45 having an upper protruding shaft 46 pivotally connected to the free end of the lever arm 31 by means of a pin 47. The spherical float 45 is provided with a peripheral skirt or flange 49 secured about its lower periphery and opposing the inlet aperture 15 communicating with the pressurized water which is generally designated by reference numeral 50.

In the securing of the pins 33, 34, 37, 38, and 47, as is commonly known, it is preferred to provide peripheral ridges in the pins located outside of the members which they connect for receiving split, resilient spring washers in snapping engagement for limiting the axial motion of the pin and securing the members together in pivotal relation.

Assuming the release orifice is open to exhaust air, when the level of the water 50 rises to a predetermined mark, the float 45 urges the lower lever arm 31 in clockwise rotation about its connecting pin 34 thereby causing a similar clockwise moment in the upper lever arm 30 and urging the closure member 40 into sealing engagement with the rim 23 surrounding the mouth of the release orifice 21. When enough air is trapped in the casing 10 to displace the water level to that shown in FIG. 2, the float 45 falls under force of gravity to induce counterclockwise rotation of the lower and upper lever arms about their respective pivotal mountings. After sufficient air is exhausted through the release orifice 21, the pressurized water will gush through the inlet pressure 15 into the chamber defined by the housing 10; however, it will be appreciated from the drawing and the above description that the inrushing water will first engage the spherical float 45, be directed toward the peripheral skirt 49 and thence be deflected downwardly to cause an upward reaction in the metallic float 45. This has been found to substantially increase the reaction time of the lever mechanisms to seal the release orifice while preventing the spurious discharge of water through it.

Turning now to the embodiment of FIG. 4, the release valve mechanism is similar in structure, operation and result to that which has already been described, and structural elements shown therein are identified with reference numerals identical to the corresponding structural element in the embodiment of FIGS. 1—3 but preceded by a "1." In the embodiment of FIG. 4, the lower lever arm 131 has a greater length between the pivotal connection 134 and the connection of the float 145 to the distal end of the lower lever arm 131, as at 147 (that is, between the connection of the metallic float 145 to the free end of the lower lever arm 131 and its pivotal fulcrum attachment to the cradle bracket 125). This provides a greater mechanical advantage in opening or closing the release orifice, as is desirable in higher pressure applications; and the inventive arrangement can thus be seen to provide a convenient mechanism for covering a broad range of design pressures while using the same structures for the linkage interconnecting the float with the closure member—an advantage over valves in present available commercially structures.

It will also be observed that in the embodiment of FIG. 4, the deflecting skirt flange 149 hovers over the inlet aperture 115 which communicates the interior of the housing 10 with the pressurized water for effecting a quick reacting identical to that already discussed.

Having thus described in detail preferred embodiments of the invention, persons skilled in the art will be able to modify certain of the structure illustrated and to substitute elements equivalent to those disclosed while continuing to practice the principle of the invention; and it is, therefore, intended that all such modifications and substitutions be covered as they are embraced within the spirit and scope of the invention.

We claim:

1. A device for releasing gas entrained in a pressurized liquid comprising: a sealed housing providing an interior chamber, an upper release orifice and a lower inlet aperture communicating said chamber with said pressurized liquid; a cradle bracket including first and second depending side plates attached to the top of said housing within said chamber; a float in said chamber; an upper and a lower lever arm each having a first and a second end and extending between said side plates; link means pivotally interconnecting said second ends of said lever arms; first pin means pivotally connecting said upper lever arm intermediate said ends to said cradle bracket at a location closer to said first end of said upper lever arm; second pin means pivotally connecting said float to said lower lever arm adjacent said first end thereof; third pin means pivotally connecting said lower lever arm to said cradle bracket at a location closer to said second end thereof; and closure means adjacent said first end of said upper lever arm for sealing said release orifice when said float is raised.

2. The device of claim 1 wherein said housing includes a cup-shaped member having an upper open end and a cover plate secured about the open end of said cup-shaped member, and further including bushing means threadably received in said cover plate and defining a release aperture, said bushing means further including a rim located about the lower periphery of said release orifice for providing a seating surface.

3. The apparatus of claim 1 wherein said closure means is adjustably secured to said first end of said upper lever arm for adjustable placement relative thereto to provide an even contact about the surface of said housing defining said release orifice.

4. The device of claim 3 further comprising means for locking said adjustable closure member in a predetermined position for said even contact with said orifice-defining location.

5. The device of claim 1 wherein said float is spherical and located directly above said inlet aperture, and further comprising a peripheral depending flange attached to the lower hemisphere of said float for deflecting inrushing liquid through said inlet aperture downwardly thereby causing a quick reaction in said lever arms to close said release orifice without permitting said liquid to escape therethrough.

6. The device of claim 1 wherein all of said lever arms, link means, cradle bracket, float, and pin means are stainless steel.

7. The device of claim 1 wherein said cradle bracket is formed of stainless steel sheet stock and wherein said lever arms are formed of stainless steel bar stock.